(12) United States Patent
Correia et al.

(10) Patent No.: US 6,424,912 B1
(45) Date of Patent: Jul. 23, 2002

(54) METHOD FOR PROVIDING VEHICLE NAVIGATION INSTRUCTIONS

(75) Inventors: John J. Correia, Livonia; Jeffrey M. Stefan, Clawson; Jasmin Jijina, Novi, all of MI (US)

(73) Assignee: General Motors Corporation, Detroit, MI (US)

(*) Notice: Subject to any disclaimer, the term of this patent is extended or adjusted under 35 U.S.C. 154(b) by 0 days.

(21) Appl. No.: 10/037,025

(22) Filed: Nov. 9, 2001

(51) Int. Cl.[7] ................................................. G06G 7/78
(52) U.S. Cl. ........................ 701/209; 701/211; 701/202
(58) Field of Search ................................ 701/211, 207, 701/202, 209, 208, 213, 212, 201, 23, 24, 25, 26; 342/357.12, 357.13, 357.08, 357.01

(56) References Cited

U.S. PATENT DOCUMENTS

| | | | | |
|---|---|---|---|---|
| 6,047,280 A | * | 4/2000 | Ashby et al. ................ 701/211 |
| 6,122,593 A | * | 9/2000 | Frederich et al. ........... 701/208 |
| 6,184,823 B1 | * | 2/2001 | Smith et al. ................. 701/209 |
| 6,249,742 B1 | * | 6/2001 | Friederich et al. ............ 701/25 |
| 6,308,177 B1 | * | 10/2001 | Israni et al. ................. 701/209 |

* cited by examiner

Primary Examiner—Richard M. Camby
(74) Attorney, Agent, or Firm—Anthony Luke Simon

(57) ABSTRACT

This invention provides a method for providing vehicle navigation instructions to a destination from its current location. A database consisting of latitude/longitude coordinates may be searched for the locations of the destination, all street intersections within a proximity region of the destination. A vehicle's location may be determined through the use of a global positioning system or other type of system. The vehicle's distance from the destination and direction toward the destination may be determined. A proximity region surrounding the destination may be determined within which to search the map database for road segments. If at least one road segment intersects the vehicle's planned path of travel between the vehicle's current location and the destination, a maneuver alert road segment closest to the destination may be determined. If at least one maneuver alert road segment is found, maneuver instructions from the maneuver alert road segment may be provided.

12 Claims, 5 Drawing Sheets

METHOD FOR PROVIDING VEHICLE NAVIGATION INSTRUCTIONS

FIELD OF THE INVENTION

In general, the invention relates to vehicle navigation. More specifically, the invention relates to a method of locating a given destination and in particular, to provide maneuver instructions to the destination while providing warning signs that a pending maneuver is approaching.

BACKGROUND OF THE INVENTION

Current navigation systems require the user to input a starting point and a destination. Based on these two points, the navigation software accesses an existing map database, attempts to calculate the best route and provide detailed maneuvering instructions such as which street to turn onto and which direction to turn.

At times, the driver may miss the turn either because it is not known that the vehicle is approaching the street, or perhaps the street is not marked well with signs. It would be desirable to provide the driver with as much navigation information as possible, yet keep the transmitted information at a minimum to avoid burdening the navigation system with too much information. A method for determining concise information to be transmitted to the vehicle would then be desirable.

Thus, there is a significant need for a method for improving vehicle navigation so that providing vehicle navigation instructions may be more easily realized.

SUMMARY OF THE INVENTION

One aspect of the invention provides a method for providing vehicle navigation instructions. This method may include receiving a destination at a map database, and receiving a vehicle's location. Next, this method may include calculating the distance between the vehicle location and the destination and calculating the distance between the destination and candidate maneuver alert road segments. Furthermore, this method may include determining the vehicle's distance from the destination and planned direction of travel toward the destination. Additionally, a proximity region surrounding the destination may be determined within which to search the map database for road segments. If at least one road segment exists inside the proximity region and intersects the vehicle's planned path of travel between the vehicle's current location and the destination, a maneuver alert road segment closest to the destination may be determined. If at least one maneuver alert road segment is found, maneuver instructions from the maneuver alert road segment may be provided.

Another aspect of the invention provides a method for expanding the proximity region outward from the destination to provide a greater area within which to search the at least one database if at least one road segment is not found within the proximity region.

Another aspect of this invention provides a system for providing vehicle navigation instructions. This system includes means for means for searching an at least one database, for receiving a destination at a map database, and for receiving a vehicle's current location. The system may also include means for calculating a distance between the vehicle location and the destination and for calculating a distance between the destination and candidate maneuver alert road segments. This system also includes means for determining a proximity region and whether at least one maneuver alert road segment exists within the proximity region. Furthermore, this system provides means for providing maneuver instructions from the closest maneuver alert road segment to the destination.

Another embodiment of this invention provides a system with means for expanding the proximity region if at least one maneuver alert road segment is not found within the proximity region.

A further aspect of this invention provides a computer usable medium for providing vehicle navigation instructions. This computer usable medium includes computer readable code to search a map database, to calculate required distances, to determine proximity areas and to determine whether at least one maneuver alert road segment exists within the proximity area. Another aspect of this computer usable medium provides computer readable code to expand the proximity area if at least one maneuver alert road segment is not found within the proximity area.

The foregoing and other features and advantages of the invention will become further apparent from the following detailed description of the presently preferred embodiment, read in conjunction with the accompanying drawings. The detailed description and drawings are merely illustrative of the invention rather than limiting, the scope of the invention being defined by the appended claims and equivalents thereof.

DETAILED DESCRIPTION OF A PREFERRED EMBODIMENT

Figure 1:
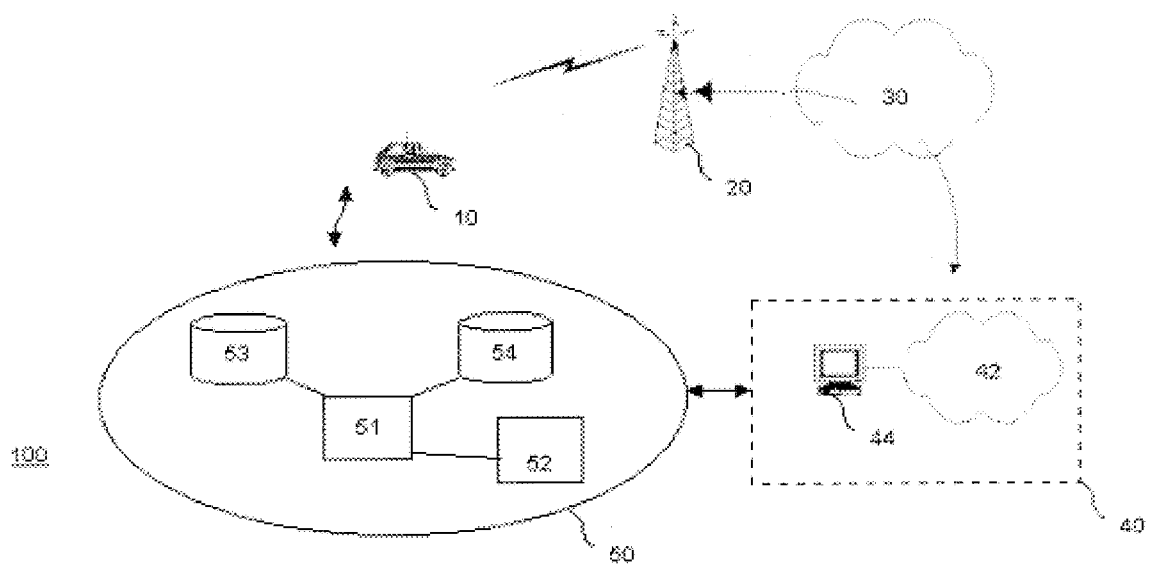
FIG. 1 is a schematic diagram of a system for generating navigation information for a vehicle in accordance with the present invention.

FIG. 1 shows one embodiment of a system for providing services to a vehicle in accordance with the present invention at 100. The system 100 may include one or more vehicle clients 10, one or more carrier systems 20, one or more communication networks 30, one or more service management subsystems 40 and one or more navigation subsystems 50. The service management subsystems may comprise one or more service management applications 42 and one or more service managers 44. The navigation subsystems 50 may comprise one or more route applications 51, 52, and one or more coordinate databases 53, 54.

Navigation subsystem 50 is a system for generating routes to be delivered to vehicle client 10 and for receiving route information from vehicle client 10. Navigation subsystem 50 may be connected with or in communication with service management subsystem 40. Service management subsystem 40 may be used to manage the delivery of information to or from navigation subsystem 50 or to other parts of system 100. Routes may be delivered or information may be received via a live agent, such as a human advisor, or via a virtual agent, such as an interactive computer program.

Navigation subsystem 50 may be any suitable hardware or software configuration, or combination of hardware and software that is configured to generate a route, process route information or receive information from vehicle client 10. In one embodiment of the invention, navigation subsystem 50 comprises one or more route applications 51, 52 and one or more coordinate databases 53, 54. For example, route applications 51, 52 may be any suitable software application for generating route information or otherwise processing route information. Coordinate databases 53, 54 may be any suitable databases for storing route information, such as location coordinates.

Vehicle client 10 may be any suitable vehicle. For example, the vehicle may be an automobile or a passenger-carrying unit such as a bus or train. Alternatively, vehicle client 10 may be an occupant of the vehicle or any suitable client device contained in the vehicle. In one embodiment of the invention, vehicle client 10 is a mobile or portable device equipped to communicate with service management subsystem 40.

Carrier system 20 is any suitable system for transmitting a signal from vehicle 10 to service management subsystem 40. Carrier system 20 may also transmit a signal from service management subsystem 40 to vehicle client 10. In one embodiment of the invention, carrier system 20 is a wireless carrier system as is well known in the art. Carrier system 20 may be, for example, a transmitter/receiver unit attached to vehicle client 10. Alternatively, carrier system 20 may be a separate transmitter/receiver carried by vehicle client 10.

Communication network 30 is any suitable system for communicating between vehicle client 10 and service management subsystem 40. In one embodiment of the invention, communication network is a public switched telephone network (PSTN). Alternatively, communication network 30 may be a multiprotocol Internet or Intranet capable of transmitting voice and/or data in either analog or digital form or a combination of both. Alternatively, communication network 30 may be a hybrid communication network or virtual network.

Service management subsystem 40 is a system for managing a variety of services to be delivered to or from vehicle client 10. In one embodiment of the invention, service management subsystem 40 manages services that are distributable over a variety of channels. For example, services may be delivered via a live agent, such as a human advisor, or via a virtual agent, such as an interactive computer program. The structure of service management subsystem 40 may enable services to be delivered in a uniform manner regardless of the channel used for delivery or of the service being delivered. Service management subsystem 40 may maintain a consistent subscriber experience and "look and feel" across the products being delivered across the service distribution channels enabled.

Service management subsystem 40 may be any suitable hardware or software configuration, or combination of hardware and software that is configured to standardize each service being delivered via the subsystem 40 and to standardize each channel of delivery. In one embodiment of the invention, service management subsystem 40 standardizes each service and channel using personalization information from vehicle client 10. Thus, service management subsystem 40 may have a common profile mechanism across the services being delivered independent of the service distribution channel (live agent, virtual agent, web channel, speech channel) and of the service (news, weather, sports, stocks, navigation instructions, etc.). In one embodiment of the invention, service management subsystem includes one or more application components 42 and one or more service managers 44. For example, application 42 may be any suitable software application for managing one or more services. Service managers 44 may be any suitable hardware and/or software configuration or structure for executing applications 42.

Figure 2:
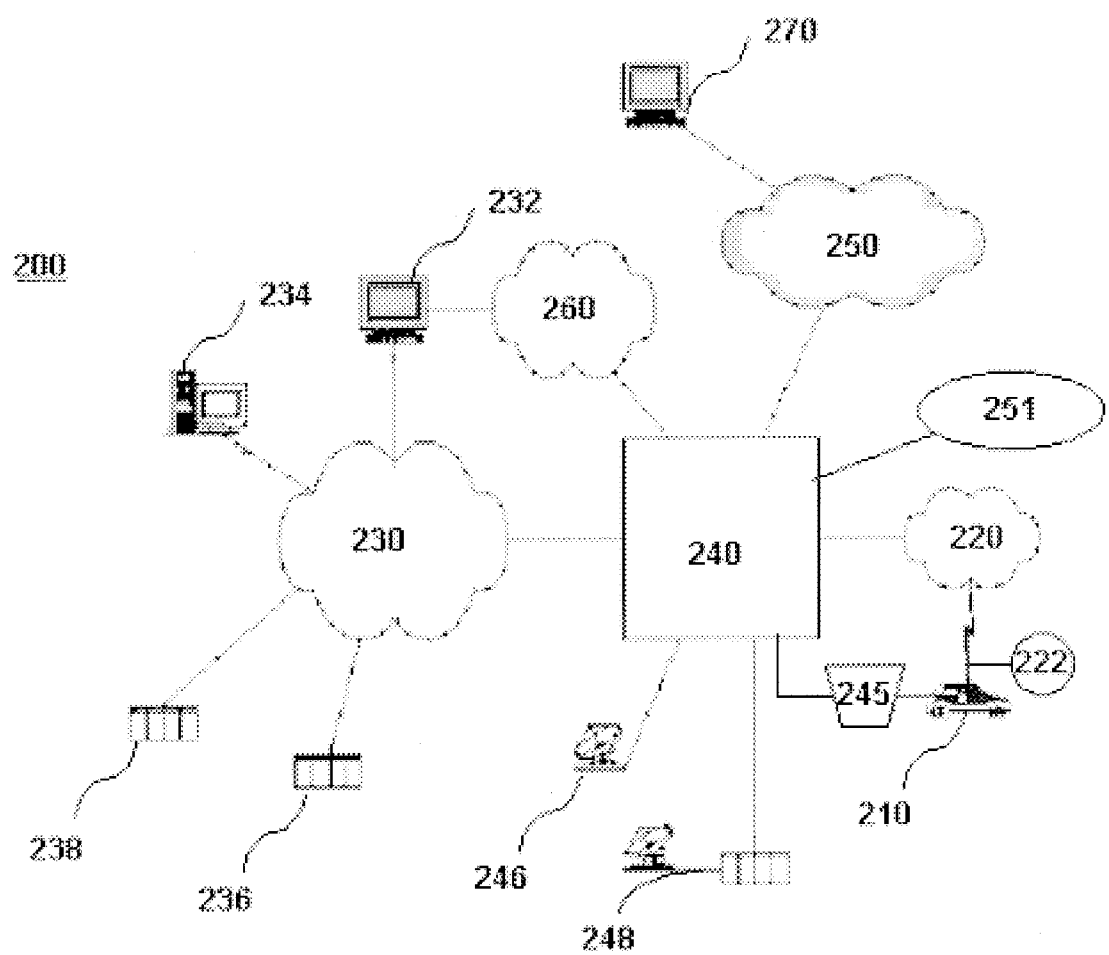
FIG. 2 is a schematic diagram of another embodiment of a system for generating navigation information for a vehicle in accordance with the present invention.

FIG. 2 shows another embodiment of a system for providing services to a vehicle in accordance with the present invention at 200. Vehicle-directed service system 200 may include a subscriber 210 and a service management application 240. In the embodiment shown in FIG. 2, the service management subsystem may be in connection with a communication network 230, such as the Internet. Service management application 240 may also be in communication with service applications or other service management subsystems. For example, in FIG. 2, service management subsystem 240 is also in communication with a subsystem for processing route information shown at 251. Service management subsystem 240 may also be in communication with a web-based service application or other web-based service management systems or web servers. For example, in FIG. 2, service management application 240 is in communication with a web channel 260.

In one embodiment of the invention, service management application may include an in-vehicle component 245. This in-vehicle component may be located in, or on or may be in communication with vehicle client 210. In one embodiment of the invention, the in-vehicle component 245 may install a software algorithm, based on the type of call originated through a voice command, in order to optimize the talk path to subscriber management application 240. System 200 may also allow the subscriber to connect to a live administrator or advisor 270 through a spoken command acknowledged through the subscriber management application 240 voice user interface (VUI).

In one embodiment of the invention, subscriber 210 may have VUI access 222 through a PSTN 220. This may serve as the primary end user interface to service management application 240. This VUI access may allow subscribers in their vehicles equipped in accordance with the present invention to access a variety of services. For example, subscribers 210 may request route information or travel information or may provide information about their route, using voice commands in a conversational manner. Furthermore, the subscriber may have the ability to interrupt or suspend the session if required. In one embodiment of the invention, connections are made to the service management application 240 through the public telephone system. In one embodiment of the invention, subscriber 210 may gain audio access to subscriber management application 240 by activating an in-vehicle speech recognition application. This speech recognition application may allow the subscriber to place hands-free cell phone calls.

Subscriber 210 may also have graphical user interface (GUI) access 232 through a communication network 230, such as the Internet. Such an interface may allow subscribers to access a variety of Internet and communication network-based services in accordance with the present invention. For example, subscriber 210 may access email via this interface. In one embodiment of the invention, subscribers connect to the service management application 240 through the Internet 230 using standard Web browsers.

Subscriber 210 may also have GUI access through a web channel 260. This interface may be used by subscribers to access a variety of services. For example, subscriber 210 may maintain one or more user profiles using web channel 260. Subscriber 210 may also set up user-related rules such as e-mail consolidation and filtering rules. This interface may also be used to access selected content services. Vehicle data, such as diagnostic codes and messages, can be consolidated and displayed using web channel 260. As with other components of system 200, information entered or accessed via web channel 260 may then be incorporated into new products and services for presentation over other channels in communication with service management subsystem 240. The subscribers 210 may connect to the web channel 260 using standard Web browsers. In one embodiment of the invention, standard web channel software interacts with the service management application to update subscriber profiles and/or to obtain information of interest. In one embodiment of the invention, the web channel 260 interface uses a dedicated connection to the service management system 240.

System 200 may also include one or more administrators 270. Administrator 270 may use GUI access to manage service management system 240 and information related to system 200. Administrator 270 may be, for example, a live advisor available to advise subscriber 210. Administrator 270 may also be, for example, an individual maintaining or administering service management subsystem 240. In one embodiment of the invention, administrator 270 accesses service management subsystem 240 via subscriber management subsystem 250. For example, administrator 270 may send configuration and subscriber information to service management system 240. Administrator 270 may also receive notifications of interesting events within system 200. In one embodiment of the invention, subscriber management subsystem 250 uses a dedicated connection between administrator 270 and service management system 240.

As seen in FIG. 2, system 200 may also include one or more message servers 234. These messages may be, for example, voice or text or e-mail mail messages. In one embodiment of the invention, message servers 234 communicate with service management application 240 via Internet 230. Thus, subscribers 210 may receive incoming email messages from, and send outgoing e-mail messages to, external mail transport agents using any suitable messaging protocol as is well known in the art. Message servers 234 may also be used to retrieve subscribers' e-mail from outside mail storage servers for consolidation into their e-mail accounts connected to system 200.

As seen in FIG. 2, system 200 may also include one or more news and or sports feeds 236. In one embodiment of the invention, feeds 236 are provided by a network news content provider. Feeds 236 may be used to receive and store audio news and sports stories for playback to interested subscribers 210. The primary interface between the speech channel and news content provider 236 may be via the Internet 230. In one embodiment of the invention, a satellite feed 246 serves as a backup mechanism.

As seen in FIG. 2, system 200 may also include one or more weather services 248. In one embodiment of the invention, the services are provided by any suitable weather reporting service. Weather services 248 may be used to receive and store regional and local weather information for playback to interested subscribers 210. Furthermore, the weather content can be delivered based on the vehicle location by coordinating the weather zone with the vehicle GPS location. The weather service 248 and/or content feed may be co-located with the service management system 240.

System 200 may also include one or more finance services 238. For example, stock quotes may be provided to the subscriber. Any suitable finance technology may be used to provide these services to interested subscribers. In the embodiment of FIG. 2, the finance information is obtained at the time of the request through Internet attached content sources or dedicated connections 230 as is known in the art.

System 200 may also include other services to be delivered in addition to news, weather, sports and finance services as described above. For example, yellow pages listings, special interest content (e.g., movie or restaurant reviews), content related to the location of the vehicle (e.g. travel profiles of nearby tourist attractions) or content related to navigation of the vehicle may all be delivered via system 200.

Figure 3:
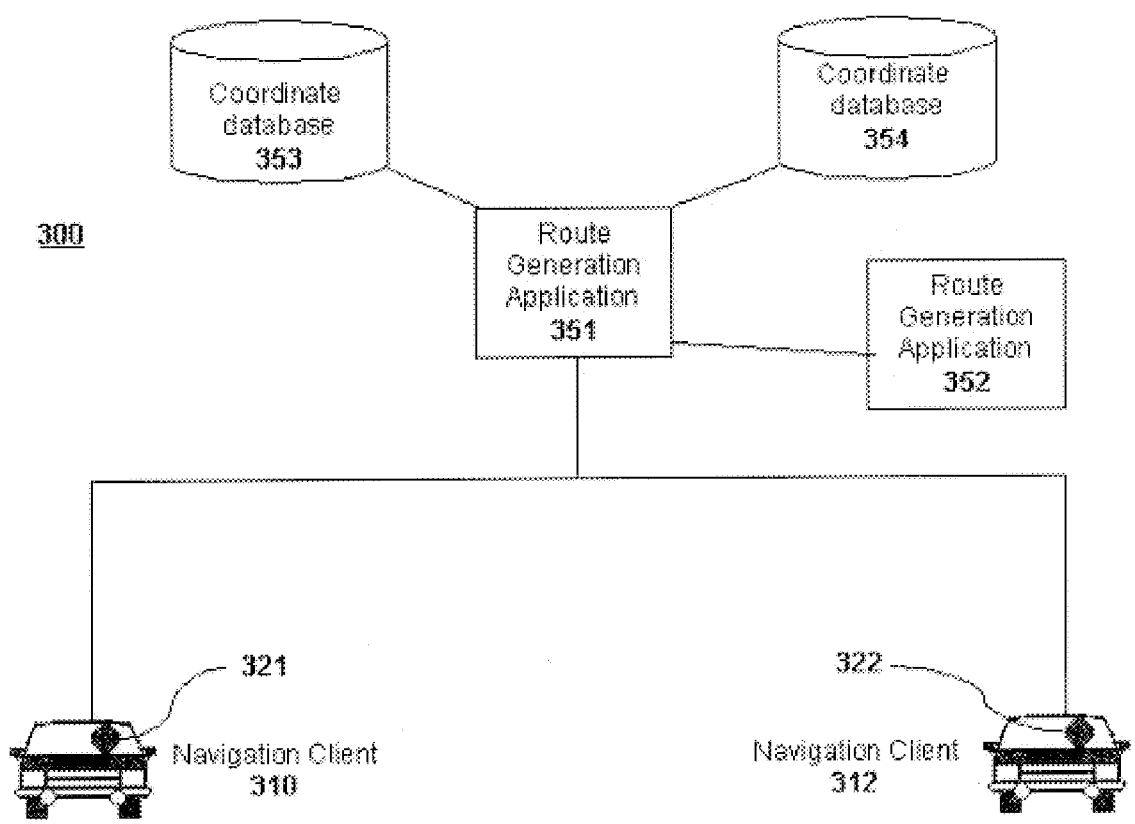
FIG. 3 is a schematic diagram of one embodiment of a navigation subsystem in accordance with the present invention.

FIG. 3 shows one embodiment of a navigation system in accordance with the present invention at 300. Navigation system 300 may include one or more navigation clients 310, 312. Each navigation client 310, 312 may have an in-vehicle navigator 321, 322. Navigation system 300 may also include one or more route generation applications 351, 352. Navigation system 300 may also include one or more coordinate databases 353, 354.

Navigation clients 310, 312 may be one or more vehicle clients as described above.

In-vehicle navigator 321, 322 may be any suitable component of navigation client 310, 312 which may be used to navigate vehicle client 310. 312. For example, in-vehicle navigator 321, 322 may be a driver. Alternatively, in-vehicle navigator 321, 322 may be an automatic system for navigating vehicle 310, 312.

Route generation applications 351, 352 may be any suitable application for calculating maneuver lists of directions between one or more locations. For example, route generation applications 351, 352 may be any suitable software or hardware programs for managing or calculating routes, portions of route or route coordinates. Route generation applications may include or be able to calculate routes from navigation client's current location to private residences, businesses or recreational facilities. In one embodiment of the invention, route generation applications 351, 352 are in communication with coordinate databases 353, 354.

Route generation applications 351, 352 may generate navigation information in any suitable manner. For example, route generation applications 351, 352 may generate routes using geocoding. That is, the application 351, 352 determines a corresponding latitude and longitude based on an input navigation address. Alternatively, route generation applications 351, 352 may generate routes using reverse geocoding. That is, the application 351, 352 determines a corresponding navigation address based on input latitude and longitude coordinates.

Coordinate databases 353, 354 may be any suitable database for storing such location coordinates as latitude and longitude of a variety of locations. These locations may be, for example, points of interest. Coordinate databases 353, 354 may also be a database of street addresses. Coordinate databases 353, 354 may also be a database of routes between points.

Figure 4:
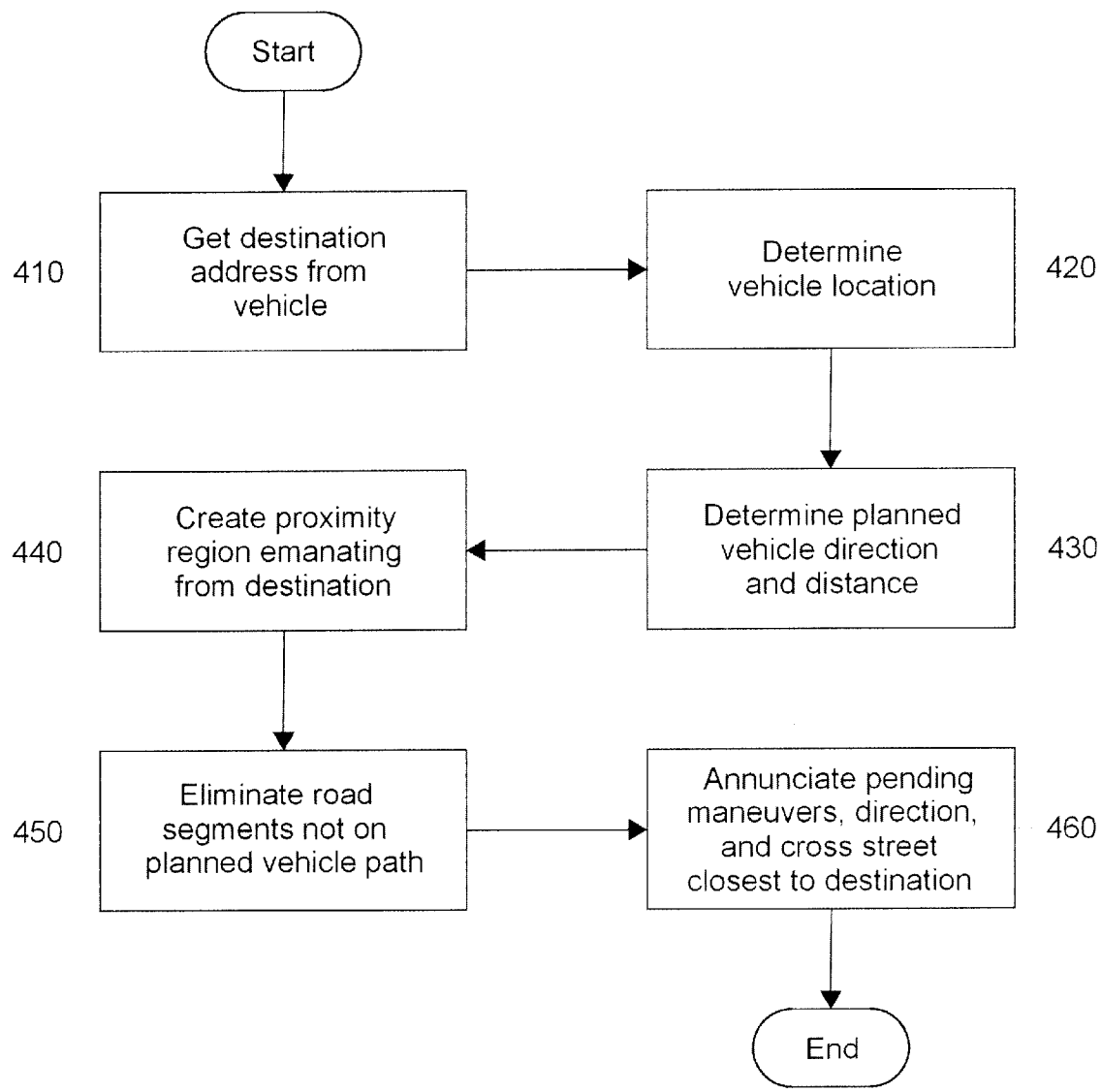
FIG. 4 is a flow chart of a preferred embodiment of a vehicle navigation algorithm in accordance with the present invention.

In FIG. 4, a method for providing vehicle navigation instructions 400 is illustrated in accordance with one embodiment of the present invention. As shown in FIG. 4, a destination may be input 410 by the vehicle client 10, 210, transmitted by the at least one communication network 30, 230 over the at least one carrier system 20, and received by the at least one navigation subsystem 50, 251 through the at least one service management subsystem 40, 240. The vehicle's current location may be determined 420 and used by the route navigation application 51, 52 to generate a route to the destination. One embodiment of the present invention may determine the vehicle's location 420 through the use of a global positioning system. Another embodiment of the present invention may determine the vehicle's location through the use of a dead reckoning system. From the vehicle's location, the distance and direction toward the destination may be determined 430. A proximity region may be created extending outward from the destination 440. Within the proximity region a search may be performed to find one or more road segments which may be used as candidate maneuver alert road segments. The proximity region may be of any shape including for example, circular, rectangular, or any other polygon shape. Any road segment inside the proximity region that does not exist on the planned vehicle path or does not intersect the planned vehicle path toward the destination may be eliminated as candidate maneuver alert road segments 450. A maneuver alert road segment may be any road segment that may intersect the vehicle's planned path, or any road feature that may alert the driver in advance to a pending maneuver. In the case that no candidate maneuver alert road segments are found within the proximity region, the proximity region may be expanded until a potential maneuver alert road segment is found between the vehicle and the destination.

A search may be performed on at least one database 53, 54 for the destination address. The database returns the geographical latitude and longitude of the destination 460. The initial proximity region may be determined based on a user preference, proximity to the destination, or geographical area. For example, a client vehicle position in the downtown area of a major city may begin with a smaller proximity region than in a rural area due to a much higher road density in the city.

Figure 5:
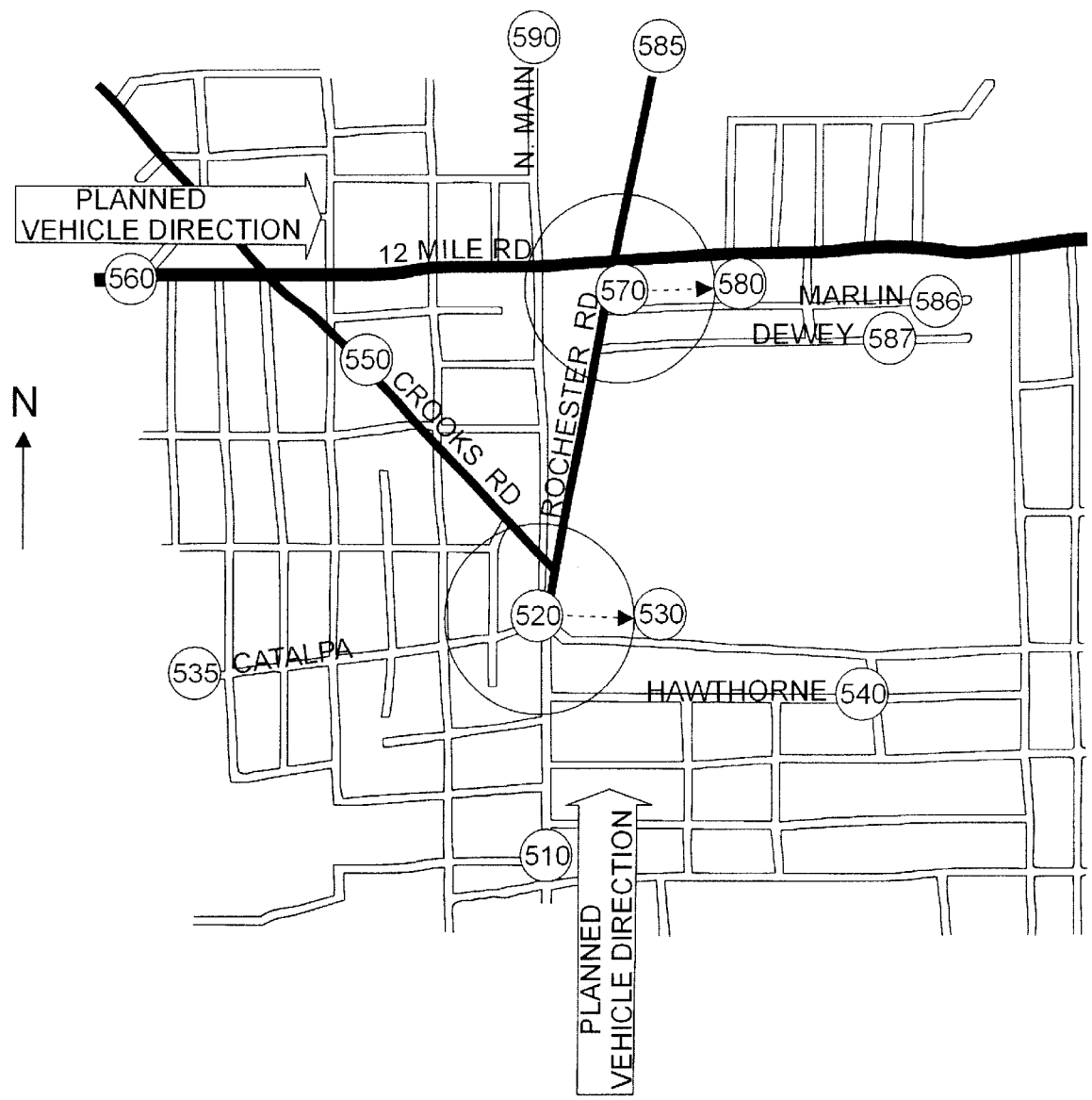
FIG. 5 is a map diagram illustrating two separate vehicle locations and two separate destinations in accordance with the present invention.

FIG. 5 is a map diagram illustrating vehicle locations with destinations in accordance with one embodiment of the present invention at 500. In one illustration, a vehicle 510 provides a destination 520 located on Catalpa 535. The navigation subsystem 50, 251 may extend a proximity region 530 from the destination within which to search for potential maneuver alert road segments. Hawthorne 540 and Crooks Rd 550 are both located within the proximity region and both intersect the street the vehicle is currently traveling on, but Crooks Rd 550 is located beyond the destination and may therefore be eliminated as a possible candidate maneuver alert road segment. Within the proximity region, only Hawthorne 540 intersects the vehicle's planned path of travel from its current location to the destination, and may therefore be used as the maneuver alert road segment. The following directions may be provided to the client vehicle 10, 210: "Turn left onto Catalpa, one block north of Hawthorne".

In a second illustration of one embodiment of the present invention, a vehicle 560 provides a destination 570 located on Rochester Rd 585. The navigation subsystem 50, 251 may extend a proximity region 580 from the destination 570 within which to search for potential maneuver alert road segments. Other than the street the destination resides on, N. Main 590, Marlin 586, and Dewey 587 are located within the proximity region. Marlin 586 and Dewey 587 do not intersect the vehicle's planned path of travel, and may be eliminated as possible maneuver alert road segments. N. Main 590 does intersect the vehicle's planned path of travel and may be used as the maneuver alert road segment. The following directions may be provided to the client vehicle 10, 210: "Turn right onto Rochester Rd, one block east of N. Main".

In both cases, the information provided includes the street on which the destination resides as well as a previous street which may be used to alert the driver of the vehicle that a maneuver is pending.

While the embodiments of the present invention disclosed herein are presently considered to be preferred, various changes and modifications can be made without departing from the spirit and scope of the invention. The scope of the invention is indicated in the appended claims, and all changes that come within the meaning and range of equivalents are intended to be embraced therein.

We claim:

1. A method of providing vehicle navigation instructions comprising:

receiving a destination at a map database;

receiving a vehicle's current location;

calculating a distance between the vehicle location and the destination;

calculating a distance between the destination and candidate maneuver alert road segments;

determining a distance from the destination and a planned direction of travel toward the destination based on the vehicle's current location;

determining a proximity region;

determining whether at least one maneuver alert road segment exists within the proximity region;

determining a maneuver alert road segment closest to the destination; and providing maneuver instructions from the closest maneuver alert road segment to the destination.

2. The method of claim 1 further comprising:

expanding the proximity region if at least one maneuver alert road segment is not found within the proximity region.

3. The method of claim 1 wherein a maneuver alert road segment comprises a cross street that intersects the vehicle's planned path of travel.

4. The method of claim 1 wherein the vehicle's planned direction of travel comprises the direction the vehicle travels in order to reach the destination.

5. The method of claim 1 wherein the vehicle's planned path of travel comprises the path the vehicle travels on each road segment in order to reach the destination.

6. A system for providing vehicle navigation instructions comprising:

means for searching an at least one database;

means for receiving a destination at a map database;

means for receiving a vehicle's current location;

means for calculating a distance between the vehicle location and the destination;

means for calculating a distance between the destination and candidate maneuver alert road segments;

means for determining a distance from the destination and a planned direction of travel toward the destination based on the vehicle's current location;

means for determining a proximity region;

means for determining whether at least one maneuver alert road segment exists within the proximity region;

means for determining a maneuver alert road segment closest to the destination; and means for providing maneuver instructions from the closest maneuver alert road segment to the destination.

7. The system of claim 6 further comprising:

means for expanding the proximity region if at least one maneuver alert road segment is not found within the proximity region.

8. A computer usable medium for providing vehicle navigation instructions comprising:

computer readable program code to search the at least one database;

computer readable program code to receive a destination at a map database;

computer readable program code to receive a vehicle's current location;

computer readable program code to calculate a distance between the vehicle location and the destination;

computer readable program code to calculate a distance between the destination and candidate maneuver alert road segments;

computer readable program code to determine a distance from the destination and a planned direction of travel toward the destination based on the vehicle's current location;

computer readable program code to determine a proximity region;

computer readable program code to determine if at least one maneuver alert road segment exists within the proximity region;

computer readable program code to determine the maneuver alert road segment closest to the destination; and computer readable program code to provide maneuver instructions from the closest maneuver alert road segment to the destination.

9. The computer usable medium of claim 8 further comprising:

computer readable program code to expand the proximity region if at least one maneuver alert road segment is not found within the proximity region.

10. The computer usable medium of claim 8 wherein a maneuver alert road segment comprises a cross street that intersects the vehicle's planned path of travel.

11. The computer usable medium of claim 8 wherein the vehicle's planned direction of travel comprises the direction the vehicle travels in order to reach the destination.

12. The computer usable medium of claim 8 wherein the vehicle's planned path of travel comprises the path the vehicle travels on each road segment in order to reach the destination.

* * * * *